United States Patent [19]
Cadoff et al.

[11] Patent Number: 4,759,879
[45] Date of Patent: Jul. 26, 1988

[54] GLASS FORMER COMPOSITION AND METHOD FOR IMMOBILIZING NUCLEAR WASTE USING THE SAME

[75] Inventors: Laurence H. Cadoff, Wilkins Township, Allegheny County, Pa.; David B. Smith-Magowan, Washington, D.C.

[73] Assignee: The United States of America as represented by the United States Department of Energy, Washington, D.C.

[21] Appl. No.: 823,218

[22] Filed: Jan. 28, 1986

[51] Int. Cl.⁴ .......................... G21F 9/16; C03G 3/00
[52] U.S. Cl. .................................... 252/629; 428/447; 501/12; 501/154; 501/155
[58] Field of Search .............................. 252/628–629; 501/12, 11, 53, 55, 54, 120, 73, 154, 155; 65/17, 134; 428/428, 446–447

[56] References Cited

U.S. PATENT DOCUMENTS

| | | | |
|---|---|---|---|
| 3,087,902 | 4/1963 | Teja | 260/4 |
| 3,640,093 | 2/1972 | Levene et al. | 65/134 |
| 3,678,144 | 7/1972 | Shoup | 264/42 |
| 4,072,501 | 2/1978 | Quinby | 423/11 |
| 4,333,847 | 6/1982 | Tran et al. | 252/629 |
| 4,376,070 | 3/1983 | Pope et al. | 252/629 |
| 4,377,507 | 3/1983 | Pope et al. | 252/629 |
| 4,389,233 | 6/1983 | Kurosaki et al. | 65/31 |
| 4,422,965 | 12/1983 | Chickering et al. | 252/629 |
| 4,430,257 | 2/1984 | Pope et al. | 252/629 |
| 4,432,956 | 2/1984 | Zarzycki et al. | 423/338 |
| 4,469,628 | 9/1984 | Simmons et al. | 252/629 |
| 4,472,510 | 9/1984 | January | 501/12 |

Primary Examiner—Stephen J. Lechert, Jr.
Assistant Examiner—Howard J. Locker
Attorney, Agent, or Firm—A. Mich, Jr.

[57] ABSTRACT

An alkoxide glass former composition has silica-containing constituents present as solid particulates of a particle size of 0.1 to 0.7 micrometers in diameter in a liquid carrier phase substantially free of dissolved silica. The glass former slurry is resistant to coagulation and may contain other glass former metal constituents. The immobilization of nuclear waste employs the described glass former by heating the same to reduce the volume, mixing the same with the waste, and melting the resultant mixture to encapsulate the waste in the resultant glass.

15 Claims, 4 Drawing Sheets

GLASS FORMER COMPOSITION AND METHOD FOR IMMOBILIZING NUCLEAR WASTE USING THE SAME

BACKGROUND OF THE INVENTION

One process for immobilizing high level nuclear waste in a glass is to melt a slurry of glass frit and a waste sludge in a liquid fed ceramic melter. An alternative approach, developed by the assignee of the present invention, and known as the reactive mixing process utilizes a colloidal solution (sol) of glass forming additives, prepared from alkoxides, instead of a glass frit. This latter process offers major advantages over the glass frit method. These include: (a) intimate mixing of the glass forming components with the waste particles which results in a lower melting temperature and a more defect free, homogeneous waste glass product, and (b) a slurry which is non-abrasive, more resistant to phase separation and more readily transportable by air lifting.

The reactive mixing process, or alkoxide based glass former process is described in U.S. Pat No. 4,376,070, issued Mar. 8, 1985, which patent is assigned to the assignee of the present invention, and which patent is incorporated by reference herein. As described in U.S. Pat. No. 4,376,070, a glass former composition is prepared containing a hydrolyzed glass-forming silicon compound, a glass-forming sodium compound, a glass-forming aluminum compound, and glass-forming boron, calcium, lithium and magnesium compounds. After the glass former composition is prepared, a nuclear waste is added thereto with stirring and heating up to 500° C. until water has been evaporated and organics volatilized and the composition is dry. The temperature is then increased up to the melting point of the mixture, between 800° C. and 1300° C. The mixture can be melted in situ or poured into ingots and cooled to produce a glass immobilized nuclear waste.

Although the alkoxide based glass former process has the above-described advantages, under certain conditions it is prone to forming a non-pumpable coagulated mass with waste slurries (especially with acid wastes) as the oxide loading is increased. Such coagulation can constrict oxide loadings to below about 300 grams/liter, a value which is about a factor of two less than that with the glass frit system.

We believe the coagulation in the alkoxide based glass former process results from the interaction between acid metal cations in the waste and soluble silica-silicates in the glass former to form stiff silicic acid precipitates or gels. Despite the large number of components and the chemical complexity of the alkoxide derived waste slurry feed, its coagulation behavior is similar to the silica/silicate-water system. The principal reactions responsible for coagulation can be represented by the following three equations:

$$Me^{+x} + xH_2O = Me(OH)_x \downarrow + xH^+ \tag{1}$$

$$2H^+ + H_2O + SiO_3^{-2} = \begin{bmatrix} Si(OH)_4 \\ \text{or} \\ H_2SiO_3 \cdot H_2O \\ \text{or} \\ SiO_2 \cdot 2H_2O \end{bmatrix} \downarrow \tag{2}$$

$$Me^{+x} + SiO_3^{-2} = Me_xSiO_3 \downarrow \tag{3}$$

Reaction (1) defines the hydrolysis of water (i.e., aqueous glass former solution) by acid metal cations ($Me^{+x}$) to form gelatinous insoluble hydroxides and hydrogen ions. These hydrogen ions, then, as given by equation (2), react with soluble silicates and/or surfaces of hydrated silica glass particles in the glass former slurry to produce a coagula of silicic acid or polysilicic acid or silica gel. The above reactions explain the propensity for gelation to increase with increasing metal ion valence. Reaction (2) is thought to be the major cause for strong coagulation in conventional alkoxide derived feed slurries with acid wastes. Equation (3) describes the formation of insoluble metal silicates; silicate and hydroxide compounds (Equation (1)) both contribute in a second order manner to increasing the viscosities of feed slurries.

We believe, therefore, that if these water soluble components are removed from either the waste or the glass former, one could completely inhibit coagulation reactions and increase oxide loadings. Elimination of the metal cations from the waste is impractical since most high level nuclear waste is acidic. We have, however, found that by using the present process to remove soluble silica/silicates from the alkoxide based glass former slurries, stable liquid-fed-melter feeds can be produced.

It is an object of the present invention to provide an alkoxide glass forming composition, for use in immobilizing nuclear waste, which is highly reactive and which is resistant to coagulation and permits production of high oxide content immobilized waste-glass compositions.

SUMMARY OF THE INVENTION

A glass former for use in immobilizing nuclear waste has silica-containing constituents thereof as solid particulates of a particle size of 0.1–0.7 micrometers in diameter in a liquid carrier phase that is substantially free of dissolved silica. The glass former slurry is resistant to coagulation and may contain various other glass former metals such as boron, sodium, calcium, and the like, with the silica content thereof being between 50 to 90 percent by weight of the glass composition, calculated as $SiO_2$.

Nuclear waste is immobilized by preparing the glass former having the specific sized silica-containing constituents and heating the same to reduce the volume thereof, mixing the glass former with the nuclear waste, and melting the resultant mixture.

DETAILED DESCRIPTION

Figure 1A:
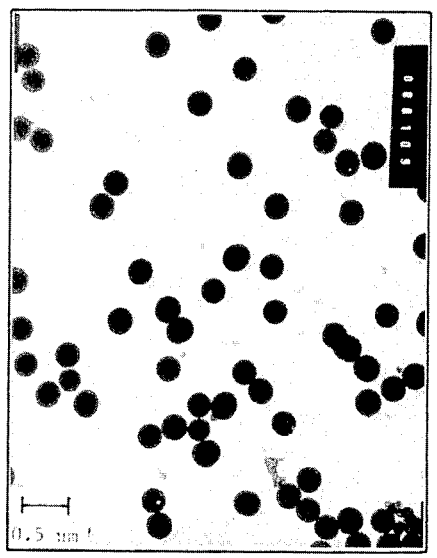
FIGS. 1A, B, C and D show transmission electron microscopy and scanning electron microscopy photomicrographs illustrating the typical precipitate size of particulates produced by fugitive base catalysis of tetraethylorthosilicate according to the present method.

Alkoxide based glass former compositions that are usable in immobilizing nuclear wastes, and are resistant to formation of coagulates when admixed with such wastes, are prepared in which the silica-containing constituents of the glass forming components are present as particulate solids in a substantially silica-free liquid carrier phase.

The glass former composition contains glass forming components including silica-containing constituents, and other glass forming constituents such as boron, sodium, lithium, magnesium, titanium, zirconium, lanthanum and the like.

The silica-containing constituents in the glass former are silicon compounds of the general formula $SiR_m(OR')_nX_p$ or $Si(OSiR_3)_4$ where each R is independently selected from alkyl to $C_{10}$ and alkenyl to $C_{10}$, each R' is independently selected from R and aryl, each X is independently selected from chlorine and bromine, m is 9 to 3, n is 0 to 4, p is 0 to 1, and m+n+p equals 4. The $SiR_m(OR')_nX_p$ compounds are preferred due to their availability, stability, and compatibility with the other glass forming constituents. The R' group is preferably alkyl to $C_4$ with n=4 because alkoxides are the most suitable starting compounds.

Examples of appropriate compounds which fall within the scope of the general formula include:

Trimethylethoxysilane $(CH_3)_3Si(OC_2H_5)$
Ethyltriethoxysilane $C_2H_5Si(OC_2H_5)_3$
Tetrapropoxysilane $Si(OC_3H_7)_4$
Tetraethylorthosilicate $Si(OC_2H_5)_4$
Tetratriethylsiloxysilane $Si[OSi(CH_3)_2C_2H_5]_4$
Treithylchlorosilane $(C_2H_5)_3SiCl$
Vinyltriphenoxysilane $CH_2:SHSi(OC_6H_5)_3$ The preferred silicon compound is tetraethylorthosilicate because it is relatively inexpensive, readily available, stable, and easy to handle.

These silicon compounds are disclosed in aforementioned U.S. Pat. No. 4,376,070, incorporated by reference herein. Other chemical constituents of the glass former may be alkoxides, acids, or salts of metals such as boron, sodium, lithium, magnesium, calcium, titanium, zirconium, lanthanum, and aluminum, which modify and improve the glass workability and durability. These metals are common glass modifiers for glasses.

The silicon content of the glass formed, calculated as $SiO_2$, should be in range of 50 to 90 percent by weight of the glass.

The formation of the glass former composition is carried out such that the silica or silicate constituents are in the form of particulate solids in a liquid carrier with substantially no silica or silicates in solution in the liquid carrier. In order to effect the formation of the solid particulate silica-containing constitutents, the hydrolysis of the silicon alkoxide is carred out by first blending the alkoxide with a mixture of alcohol and water. The alcohol is preferably the same alcohol that is produced during hydrolyzation so that it is not necessary to separate two alcohols. The molar ratio of silicon compound to the alcohol can range from about 0.2 to about 2. The molar ratio of silicon compound to water is about 0.01 to 0.2. This alkoxide-alcohol-water solution is then fully hydrolyzed with a large excess of a fugitive base catalyst such as ammonia. The term "fugitive base catalyst", as used herein designates a compound that will decompose to form ammonia, such as ammonium hydroxide, organic quaternary ammonium hydroxides such as tetraethylammonium hydroxide, organic amines and diamines, and other organic compounds, such as urea. The ammonia thus formed is, after effecting the hydrolysis, driven off from the slurry, i.e. a fugitive.

The silicon alkoxide is hydrolyzed with a fugitive base catalyst that is present in an excess amount, i.e. a molar ratio of ammonia (as $NH_3$) to alkoxide of 1.5 to 20.0, preferably 1.5 to 3.0. Other alkoxides, such as boron alkoxides, when present, are also hydrolyzed in the presence of excess fugitive base catalyst. Or, the boron compounds, as with other components of the glass, such as sodium, lithium, or the like, may be added to the hydrolyzed silicon alkoxide in the form of nitrates or oxides.

Figure 1B:
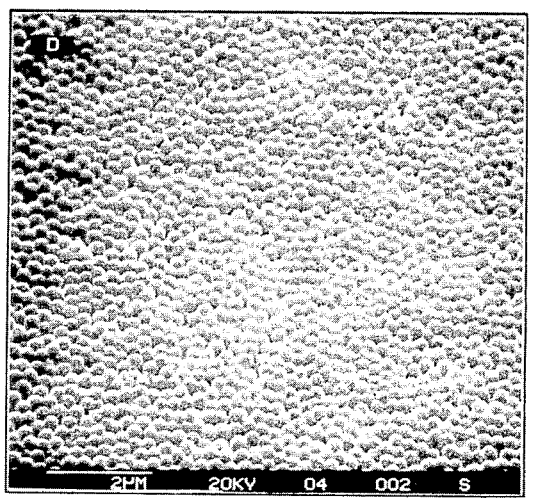
Figure 1C:
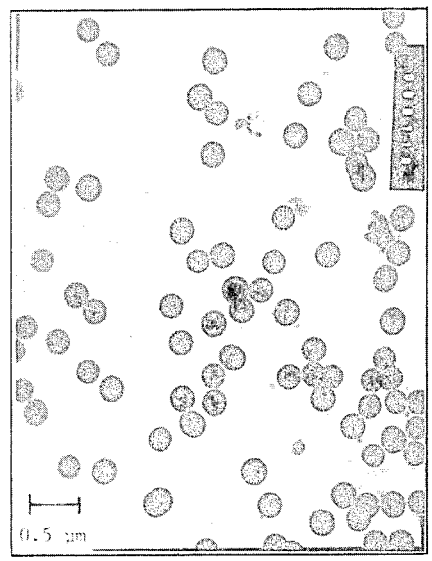
Figure 1D:
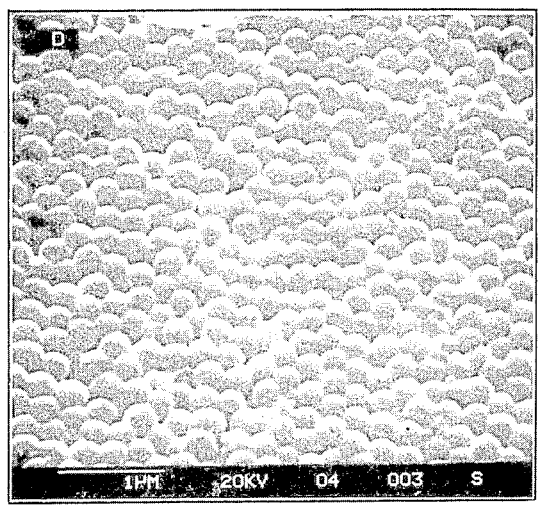

The solid silica-containing constituents formed are present as particles having an average diameter of between 0.1 to 0.7 micrometers, preferably between 0.2 to 0.5 micrometers. The particulate solids are preferably of spheriodal shape. The photomicrographs of FIGS. 1A through D illustrate the spherical particulate solids formed by fugitive base catalyzed hydrolyzation of tetraethylorthosilicate according to the present method, wherein FIGS. 1A and 1C are transmission electron microscopy photomicrographs and FIGS. 1B and 1D are scanning electron photomicrographs. These particles are small enough to to react rapidly with a high level waste solid (i.e., small diffusion distances) but large enough to resist dissolution into the liquid carrier. With formation of the silica-containing constituents by the present method, the liquid carrier is substantially free of dissolved silica, having a dissolved silica content of less than 100 parts per million by weight of dissolved silica, calculated as Si, in the liquid carrier.

In preparing the glass forming composition, the silicon compound is hydrolyzed as aforedescribed, and other compounds which can be hydrolyzed, such as boron alkoxide, may also be hydrolyzed in the presence of an excess of fugitive base catalyst, prior to adding to the composition. The remaining constituents are then added as nitrates or oxides and the mixture heated to an elevated temperature (90° C.) to increase their loadings by removing excess water, alcohol and the fugitive ammonia catalyst and to obtain a near neutral (about pH7–8.5) slurry.

Such glass former slurries have been concentrated to near dryness (fraction solids by wieght of oxides in original slurry, fs>0.8) without coagulation reactions. By comparison, conventional alkoxide glass former slurries autogel at above fs>0.3. Nearly dry glass former compositions prepared by the present process can be reconstituted into tractable slurries of any desired fraction solid by simple blending with water or waste sludge. This feature permits oxide loadings in these feed slurries to exceed those practicably obtainable with the glass frit process.

The immobilization of nuclear waste according to the present method is effected by combining the glass forming composition with the waste and heating. The glass forming composition is mixed with the nuclear waste with stirring and heating up to about 500° C. until the water has been evaporated and the composition is dry. The temperature is then increased to melt the mixure, at a temperature of between about 700°–1500° C., dependent upon the particular composition. Various types of melting systems would be usable to achieve the desired temperatures and waste immobilization in the glass produced.

EXAMPLE

The following mixtures were prepared:

(A) A mixture of 222 grams tetraethylorthosilicate in 195 milliliters of ethanol and 95 milliliters of water;

(B) A mixture of 142 milliliters of concentrated NH$_4$OH (28-30 wt.% as NH$_3$) in 700 milliliters of water;

(C) A mixture of 53 grams triethylborate in 306 milliliters of ethanol and 26 milliliters of water;

(D) A mixture of 34 mulliliters of concentrated NH$_4$OH (as above), 168 mulliliters of water, 41.6 grams NaNO$_3$, and 22.6 grams of LiNO$_3$; and (E) A mixture of 1.7 grams MgO, 0.9 grams TiO$_2$, 0.4 grams ZrO$_2$, and 0.4 grams La$_2$O$_3$.

Figure 2A:
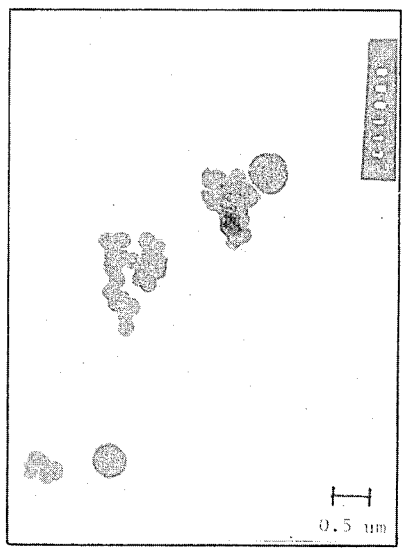
FIGS. 2A, B, C and D show transmission electron microscopy and scanning electron microscopy photomicrographs illustrating the typical precipitate size of particulates produced by fugitive base catalysis of a typical glass former composition according to the present invention.
Figure 2B:
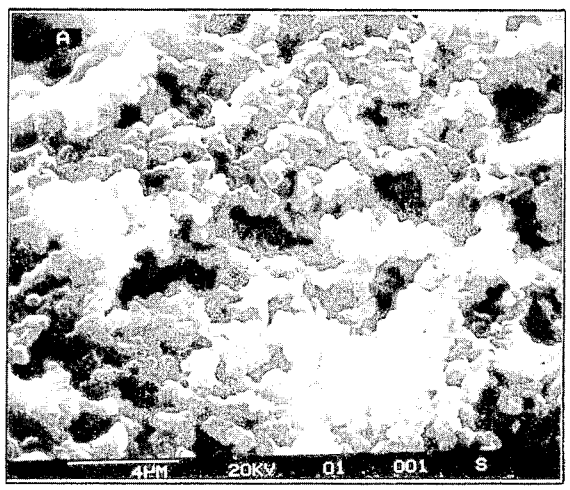
Figure 2C:
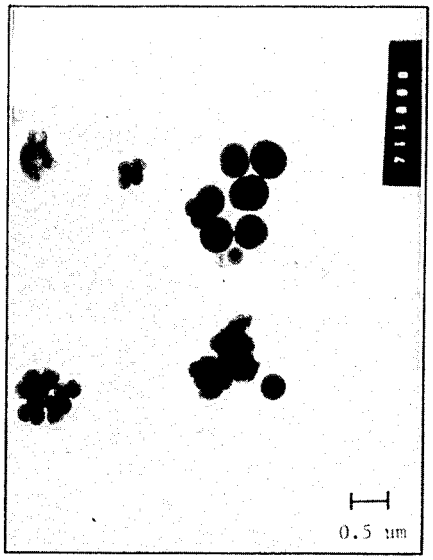
Figure 2D:
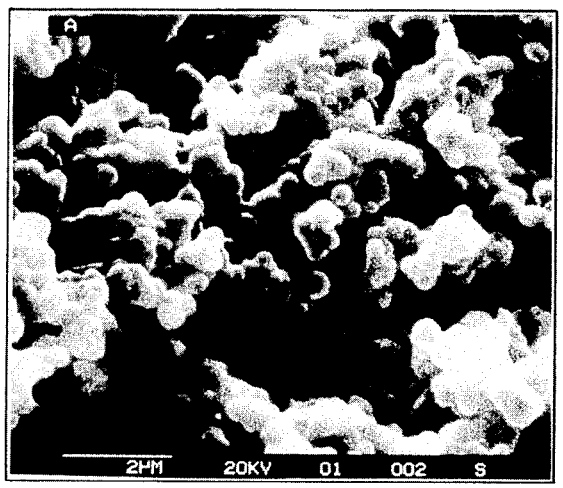

Mixture B was slowly blended into mixture A until the admixture (Admixture 1) just turned turbid. Mixture D was slowly blended into mixture C until the admixture (Admixture 2) just turned turbid. Admixture 2 was blended into Admixture 1 and the remainder of mixtures B and D were slowly added thereto. Mixture E was then added into the resultant formulation to form a glass former mixture. The photomicrographs of FIGS. 2A through D illustrate the spherical particulate solids formed in a typical above-described glass former, which indicates that it consists of partially agglomerated spherical particles of between 0.2 to 0.5 micrometers, wherein FIGS. 2A and 2C are transmission electron microscopy photomicrographs and FIGS. 2B and 2C are scanning electron photomicrographs. The glass former mixture was then slowly heated and stirred at about 90° C. to reduce the volume thereof by approximately 60 percent to yield a glass former which had a pH of between 7-8.5 and a fs=0.15 (after calcining at 700° C.) and a "soluble" Si content of less than 70 ppm (parts per million, by weight).

The glass composition of the glass formed from the above glass former composition was (weight percent): SiO$_2$-63.9%; B$_2$O$_3$-12.6%; Na$_2$O-15.2%; LiO$_2$-4.9%; MgO-1.7%; TiO$_2$-0.9%; ZrO$_2$-0.4%; and La$_2$O$_3$-0.4%.

Immobilization of waste using the above described glass former composition was then carried out. A glass former-waste feed slurry was prepared by blending 100 grams of the above described alkoxide derived glass former with 59 grams of a simulated 2M acidic nuclear waste slurry. The composition of the waste slurry was:

Composition of Simulated Acid Nuclear Waste

| Compound | Weight, gm |
|---|---|
| Fe(NO$_3$)$_3$.9H$_2$O | 235.19 |
| NaNO$_3$ | 89.95 |
| HNO$_3$* | 126.00 |
| ZrO(NO$_3$)$_2$.2H$_2$O+ | 16.26 |
| Na$_3$PO$_4$ | 14.17 |
| Cr(NO$_3$)$_3$.9H$_2$O | 14.94 |
| Nd(NO$_3$)$_3$.6H$_2$O+ | 3.65 |
| Al(NO$_3$)$_3$.9H$_2$O | 16.18 |
| Mn(NO$_3$)$_2$.4H$_2$O | 6.35 |
| Ni(NO$_3$)$_2$.6H$_2$O | 7.01 |
| Na$_2$SO$_4$ | 6.20 |
| KNO$_3$ | 3.65 |
| CaNO$_3$ | 0.55 |
| RuO$_2$ | 0.08 |
| Sr(NO$_3$)$_2$ | 0.27 |
| RE(NO$_3$)$_3$**+ | 2.36 |

-continued

| Compound | Weight, gm |
|---|---|
| Na$_2$MoO$_4$.2H$_2$O | 0.12 |

*HNO$_3$ concentration is 2 Molar
**Rare Earth Nitrate Mix. Nominal Oxide Compositions
CaO$_2$ —48%  Sa$_2$O$_3$ —3%
La$_2$O$_3$ —24%  Gd$_2$O$_3$ —2%
Nd$_2$O$_3$ —17%  Y$_2$O$_3$ —0.2%
Pr$_6$O$_{11}$ —5%  misc. —0.8%
+Substitutes for actinide elements The composition of the waste slurry was prepared by mixing the constituents with water to obtain a one liter mixture.

The glass former-waste feed slurry was added to a platinum crucible, dried at about 100° C., and heated in air until molten. Uniform melting occurred at 1150° C. with no foaming. A homogenous, defect-free glass containing about 30 weight percent waste oxides was produced whether the glass was furnace cooled or quenched after a two-hour hold at 1150° C. The melting temperature was about 100° C. lower and the glass homogeneity significantly better than that obtained by melting a similar waste-glass slurry formulation where a glass frit was substituted for the alkoxide derived glass former.

The glass former of the present invention can be concentrated to very high fraction solids without coagulation and because the particles are submicion and spherical should not form gummy or hard sediments as do glass frit or glass flour based feed slurries. It may be reasonable to achieve total oxide loadings (total of waste oxides and glass oxides in the waste and glass former slurry mixture) in the feed slurry of greater than 600 grams per liter, while total oxide loadings of greater than 550 grams per liter have been prepared. The glass former composition is usable in immobilizing either acidic or basic nuclear wastes.

What is claimed is:

1. In a glass forming slurry for use in immobilizing nuclear waste where said slurry comprises alkoxide glass forming components containing hydrolyzed glass-forming silicon compound in a liquid carrier, the improvement which makes slurry resistant to coagulation, comprising using said hydrolyzed glass-forming silicon compound in the form of particulate solids having a particle size of 0.1-0.7 micrometer in diameter, so that said liquid carrier phase is substantially free of dissolved hydrolyzed glass-forming silicon compound.

2. The glass forming slurry as defined in claim 1 wherein said particulate solids are substantially spherical in form.

3. The glass forming slurry as defined in claim 2 wherein said particulate solids have a particle size of 0.2-0.5 micrometer in diameter.

4. The glass forming slurry as defined in claim 1 wherein said particulate solids are formed by hydrolysis of a silicon compound having the general formula SiR$_m$(OR')$_n$X$_p$ or Si(OSiR$_3$)$_4$ where each R is independently selected from alkyl to C$_{10}$ and alkenyl to C$_{10}$, each R' is independently selected from R and aryl, each X is independently selected from chlorine and bromine, m is 0 to 3, n is 0 to 4, p is 0 to 1, and m+n+p equals 4.

5. The glass forming slurry as defined in claim 1 wherein said particulate solids are formed by hydrolysis of tetraethylorthosilicate.

6. The glass forming slurry as defined in claim 1 wherein said glass forming slurry contains glass forming components selected from the group consisting of alkoxides, acids, or salts of boron, sodium, lithium, magnesium, calcium, titanium, zirconium, lanthanum, aluminum, and mixtures thereof.

7. The glass forming slurry as defined in claim 1 wherein said particulate solids are present, calculated as $SiO_2$, in an amount of 50 to 90 percent by weight of said glass forming components.

8. In a method of immobilizing nuclear waste in glass where a glass forming composition is prepared which comprises a slurry of alkoxide glass forming components containing hydrolyzed glass-forming silicon compound in a liquid carrier, where said composition is heated at an elevated temperature to reduce the volume thereof and provide a glass former, said glass former is mixed with nuclear waste at up to 500° C., and the resultant mixture is melted at about 700°–1500° C., the improvement which makes said composition resistant to coagulation comprising using said hydrolyzed glass-forming silicon compound in the form of particulate solids having a particle size of 0.1–0.7 micrometer in diameter, so that said liquid carrier is substantially free of said dissolved hydrolyzed glass-forming silicon compound.

9. The method as defined in claim 8 wherein said hydrolyzed glass-forming silicon compound is formed by hydrolyzing a silicon compound having the general formula $SiR_m(OR')_nX_p$ or $Si(OSiR_3)_4$ where each R is independently selected from alkyl to $C_{10}$ and alkenyl to $C_{10}$, each R' is independently selected from R and aryl, each X is independently selected from chlorine and bromine, m is 0 to 3, n is 0 to 4, p is 0 to 1, and $m+n+p$ equals 4 in admixture with an alcohol-water carrier in the presence of an excess of a fugitive base catalyst.

10. The method as defined in claim 9 wherein said fugitive base catalyst is ammonia and is present in an amount of a 1.5 to 20 molar ratio of ammonia to alkoxide.

11. The method as defined in claim 9 wherein said silicon compound is tetraethylorthosilicate.

12. The method as defined in claim 11 wherein a boron alkoxide is provided in said slurry and said boron alkoxide is hydrolyzed in admixture with an alcohol-water carrier in the presence of an excess of a fugitive base catalyst.

13. A glass immobilized nuclear waste prepared according to the process of claim 8.

14. A glass immobilized nuclear waste prepared according to the process of claim 10.

15. The glass forming slurry as defined in claim 1 wherein said slurry contains nuclear waste.

* * * * *